United States Patent
Williams et al.

(10) Patent No.: US 10,309,821 B2
(45) Date of Patent: Jun. 4, 2019

(54) SENSOR FOR INVENTORY MANAGEMENT APPLICATIONS WITH REMOTE MOUNTING AND ASYMMETRIC REFLECTION MODELING

(71) Applicant: Honeywell International Inc., Morris Plains, NJ (US)

(72) Inventors: Michael Williams, Coquitlam (CA); Michael Conroy, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 15/452,508

(22) Filed: Mar. 7, 2017

(65) Prior Publication Data

US 2018/0156652 A1    Jun. 7, 2018

Related U.S. Application Data

(60) Provisional application No. 62/431,367, filed on Dec. 7, 2016.

(51) Int. Cl.
   *G01F 23/284* (2006.01)
   *G01S 7/03* (2006.01)
   *G01S 7/292* (2006.01)

(52) U.S. Cl.
   CPC ............ *G01F 23/284* (2013.01); *G01S 7/038* (2013.01); *G01S 7/2921* (2013.01)

(58) Field of Classification Search
   CPC ................. G01F 23/284; G01S 7/038
   (Continued)

(56) References Cited

U.S. PATENT DOCUMENTS 3,703,829 A    11/1972    Dougherty et al.
5,148,177 A *   9/1992    Nagamune ............. B22D 2/003
                                                       342/124

(Continued)

FOREIGN PATENT DOCUMENTS

WO    2016053978 A1    4/2016

OTHER PUBLICATIONS

U.S. Appl. No. 15/361,639, Specification as filed Nov. 28, 2016, 28 pages.

(Continued)

*Primary Examiner* — Marcus E Windrich
(74) *Attorney, Agent, or Firm* — Loza & Loza LLP; Kermit D. Lopez; Luis M. Ortiz

(57) ABSTRACT

An apparatus includes a transmitter configured to transmit a signal having an electromagnetic pulse towards material in a tank. The apparatus also includes a receiver configured to receive a signal having multiple reflections of the pulse, including a process connector reflection. The apparatus further includes at least one processing device configured to determine a measurement associated with the material in the tank based on the received signal. To determine the measurement, the at least one processing device is configured to identify the process connector reflection in the received signal using an asymmetrical model. The transmitter, the receiver, and the at least one processing device could form at least part of an electronics assembly, and a connecting cable could couple the electronics assembly and a process connector. The asymmetrical model could have different lobes of different shapes.

20 Claims, 4 Drawing Sheets

(58) Field of Classification Search
USPC .......................................................... 342/124
See application file for complete search history.

(56) References Cited

U.S. PATENT DOCUMENTS

| | | | |
|---|---|---|---|
| 6,690,320 B2* | 2/2004 | Benway | G01F 23/284 |
| | | | 324/332 |
| 6,972,712 B1 | 12/2005 | Karlsson | |
| 8,159,386 B2 | 4/2012 | Malinovskiy et al. | |
| 2004/0257269 A1 | 12/2004 | Laun | |
| 2005/0285777 A1 | 12/2005 | Karlsson | |
| 2006/0262321 A1* | 11/2006 | De Groot | G01B 11/2441 |
| | | | 356/503 |
| 2010/0070209 A1 | 3/2010 | Sai | |
| 2013/0231877 A1* | 9/2013 | Weber | G01F 23/0061 |
| | | | 702/55 |
| 2014/0104098 A1 | 4/2014 | Linden et al. | |
| 2014/0104099 A1 | 4/2014 | Janitch | |
| 2014/0125515 A1 | 5/2014 | Turcotte et al. | |
| 2014/0140379 A1* | 5/2014 | Teplitsky | H04L 27/364 |
| | | | 375/219 |
| 2015/0052846 A1 | 2/2015 | Gonzalez Del Egido et al. | |
| 2015/0168201 A1* | 6/2015 | Cobianu | G01F 23/284 |
| | | | 342/124 |
| 2015/0276458 A1* | 10/2015 | Cobianu | G01F 23/284 |
| | | | 342/124 |
| 2015/0276460 A1* | 10/2015 | Georgescu | G01F 23/284 |
| | | | 342/124 |
| 2016/0097669 A1 | 4/2016 | Backstrom et al. | |
| 2016/0097670 A1 | 4/2016 | Hughes et al. | |
| 2016/0098500 A1 | 4/2016 | Haran et al. | |
| 2016/0117426 A1 | 4/2016 | Savard et al. | |
| 2016/0266240 A1 | 9/2016 | Hughes et al. | |
| 2016/0305812 A1 | 10/2016 | Beselt et al. | |

OTHER PUBLICATIONS

Foreign Communication From a Related Counterpart Application, PCT Application No. PCT/US2016/052846, International Search Report dated Dec. 11, 2015, 3 pages.

Foreign Communication From a Related Counterpart Application, PCT Application No. PCT/US2016/052846, Written Opinion dated Dec. 11, 2015, 5 pages.

* cited by examiner

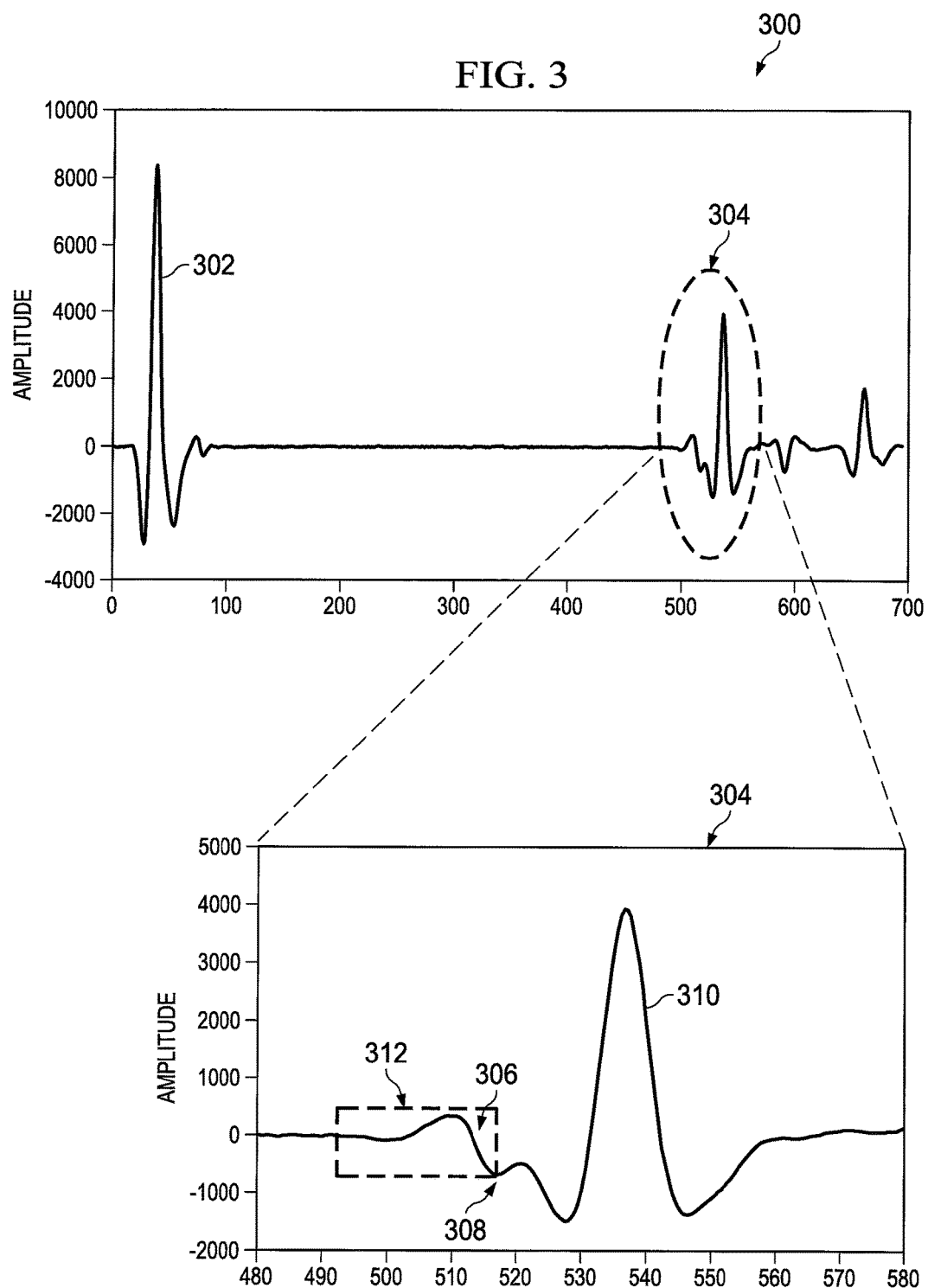

SENSOR FOR INVENTORY MANAGEMENT APPLICATIONS WITH REMOTE MOUNTING AND ASYMMETRIC REFLECTION MODELING

CROSS-REFERENCE TO RELATED APPLICATION AND PRIORITY CLAIM

This application claims priority under 35 U.S.C. § 119(e) to U.S. Provisional Patent Application No. 62/431,367 filed on Dec. 7, 2016. This provisional application is hereby incorporated by reference in its entirety.

TECHNICAL FIELD

This disclosure generally relates to inventory management systems. More specifically, this disclosure relates to a sensor for inventory management applications with remote mounting and asymmetric reflection modeling.

BACKGROUND

Processing facilities and other facilities routinely include tanks for storing liquids or other materials. For example, storage tanks are routinely used in tank farms and other storage facilities to store oil or other materials. As another example, oil tankers and other transport vessels routinely include numerous tanks storing oil or other materials. Processing facilities also often include tanks for implementing industrial processes.

Often times, it is necessary or desirable to measure the amount of material stored in a tank. This may be useful, for example, during loading of material into the tank or unloading of material from the tank or during liquid stock accounting. As a particular example, "legal metrology" often requires highly accurate measurements from a level sensor installed on the roof of a tank, such as during custody transfers or when levying taxes or duties. In bulk storage tanks, an error of one millimeter in a level reading can correspond to several cubic meters of volumetric error. This can result in losses of thousands of dollars for one or more parties. Moreover, this can have negative effects on stock reconciliation, which involves attempting to track where materials are located and how materials are lost.

Radar sensors are one type of sensor commonly used in various industries to measure material levels in tanks. A radar sensor transmits electromagnetic pulses towards material in a tank (possibly through a physical waveguide), and the pulses are reflected at different points including a surface of the material. The radar sensor uses time-of-flight calculations with the pulse reflections to measure a distance to the material. Radar sensors can also be used in multiple-material applications, such as with oil and water mixtures to measure distances to the oil surface and to the water surface underneath the oil. Other types of sensors can also be used to measure material levels in single-material or multiple-material applications.

SUMMARY

This disclosure provides a sensor for inventory management applications with remote mounting and asymmetric reflection modeling.

In a first embodiment, an apparatus includes a transmitter configured to transmit a signal having an electromagnetic pulse towards material in a tank. The apparatus also includes a receiver configured to receive a signal having multiple reflections of the pulse, including a process connector reflection. The apparatus further includes at least one processing device configured to determine a measurement associated with the material in the tank based on the received signal. To determine the measurement, the at least one processing device is configured to identify the process connector reflection in the received signal using an asymmetrical model.

In a second embodiment, a method includes transmitting a signal having an electromagnetic pulse towards material in a tank. The method also includes receiving a signal having multiple reflections of the pulse including a process connector reflection. In addition, the method includes determining a measurement associated with the material in the tank using the received signal, where determining the measurement includes identifying the process connector reflection in the received signal using an asymmetrical model.

In a third embodiment, a non-transitory computer readable medium contains instructions that, when executed by at least one processing device, cause the at least one processing device to obtain information associated with a received signal having multiple reflections of an electromagnetic pulse that is transmitted towards material in a tank. The multiple reflections include a process connector reflection. The medium also contains instructions that, when executed by the at least one processing device, cause the at least one processing device to determine a measurement associated with the material in the tank using the information associated with the received signal. The instructions that when executed cause the at least one processing device to determine the measurement include instructions that when executed cause the at least one processing device to identify the process connector reflection in the received signal using an asymmetrical model.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3 and 4 illustrate example uses of a sensor with remote mounting and asymmetric reflection modeling according to this disclosure.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
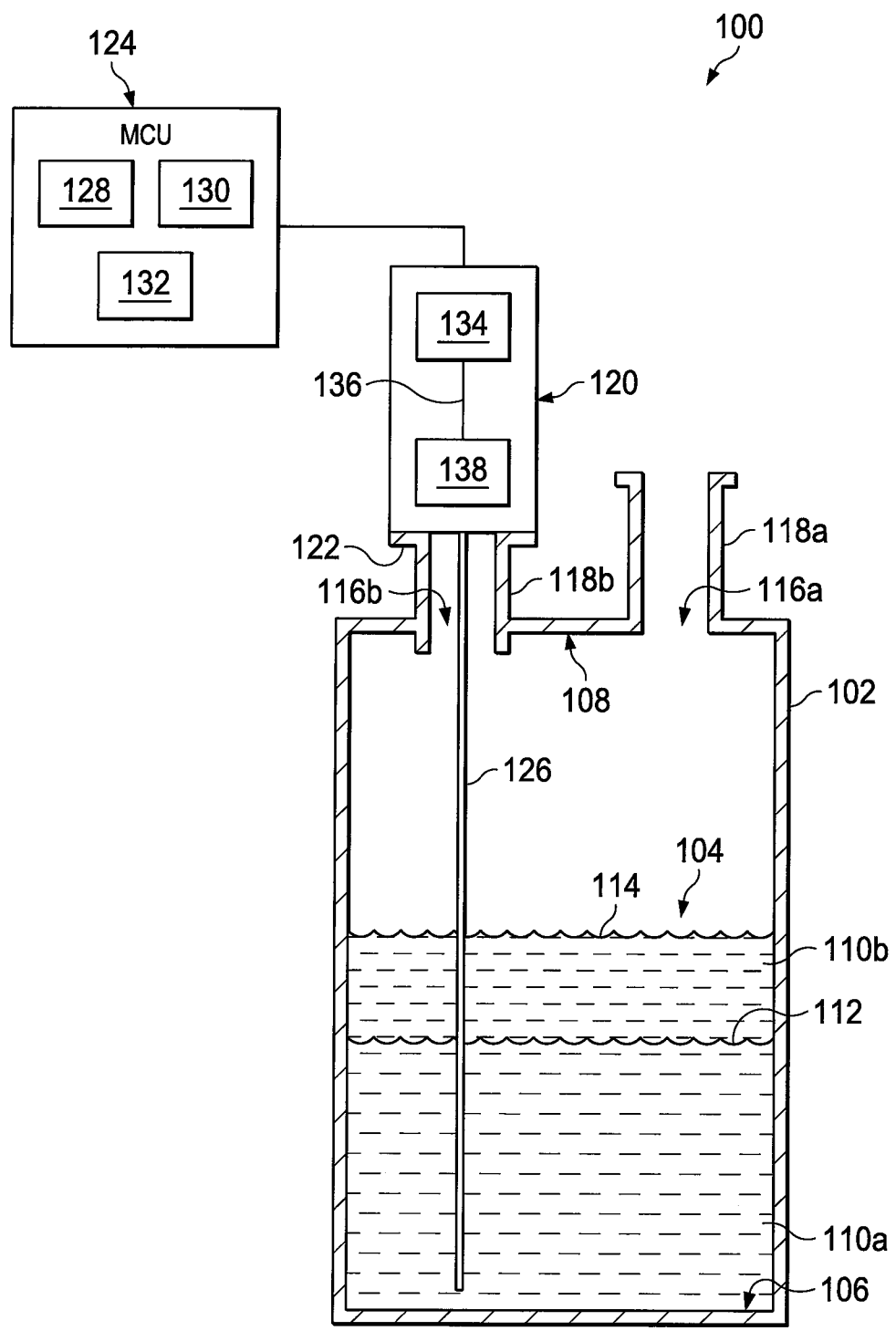
FIG. 1 illustrates an example inventory management system according to this disclosure.

FIG. 1 illustrates an example inventory management system 100 according to this disclosure. As shown in FIG. 1, the system 100 includes a tank 102, which represents any suitable structure for receiving and storing at least one material 104. The tank 102 can have any suitable shape, size, and dimensions. The tank 102 can also form part of a larger structure, such as any fixed or movable structure containing or associated with one or more tanks 102 (like a movable tanker vessel, railcar, or truck or a fixed tank farm). In this example, the tank 102 includes a floor 106 and a roof 108.

The tank 102 can be used to store any suitable materials 104, such as one or more fuels, oils, or other processed or unprocessed hydrocarbons, water, or other material(s). Also, multiple materials 104 could be stored in the tank 102. Depending on the materials 104, the materials 104 can sometimes separate or stratify to form multiple layers. In the example shown in FIG. 1, there are two layers 110a-110b of material, and an interface 112 forms where the top surface of the first layer 110a meets the bottom surface of the second layer 110b. As a particular example, the tank 102 can be used to separate oil from water, in which case the interface 112 represents where the bottom surface of the oil meets the top surface of the underlying water. Also, an air-material interface exists at a top surface 114 of the second layer 110b, and the air-material interface denotes the top of the material 104 in the tank 102.

The roof 108 of the tank 102 includes one or more openings or ports 116a-116b providing access to an interior of the tank 102, and nozzles 118a-118b could be coupled to the ports 116a-116b. In this example, the nozzle 118a is flush with the roof 108 of the tank 102, while the nozzle 118b is not flush with the roof 108 and extends some distance into the tank 102. However, the forms of the ports 116a-116b and nozzles 118a-118b shown here are examples only, and the ports 116a-116b and nozzles 118a-118b could have any other suitable configurations.

A sensor 120 is used to capture measurements associated with the material 104 in the tank 102. For example, the sensor 120 could identify a level of the material 104 in the tank 102 as defined by the top surface 114 of the material 104. As another example, the sensor 120 could identify the interface 112 between the layers 110a-110b of material 104 in the tank 102. These values can be used to identify the thickness of one or more of the layers 110a-110b of material 104 in the tank 102. In this example, the sensor 120 is mounted to a top end 122 of the nozzle 118b in order to hold the sensor 120 away from the material 104 even when the tank 102 is full. However, the sensor 120 could be mounted on or to the tank 102 in any other suitable manner.

The system 100 also includes a main control unit (MCU) 124, which controls the overall operation of the system 100. For example, the MCU 124 could receive measurements from the sensor 120, control automatic loading or unloading of material 104 into or out of the tank 102, and generate an alarm when the level of material 104 is approaching the top or bottom of the tank 102 or when a possible leak is detected in the tank 102. The MCU 124 could be remotely located from the sensor 120. In other embodiments, the system 100 does not include a separate MCU 124, and the functionality of the MCU 124 can be incorporated into the sensor 120.

The sensor 120 generally operates by transmitting radar, ultrasonic, or other electromagnetic pulses toward the material 104 and receiving reflections of the pulses from the material 104 and from the tank 102 itself or other structures. The sensor 120 analyzes the reflections to identify pulses that, for example, reflect from the top surface 114 or from the interface 112. Using those reflections, the sensor 120 can identify distance(s) to the top surface 114 or the interface 112, which can be used to identify the level of the material 104, the location of the interface 112 in the tank 102, or the thickness(es) of the layer(s) 110a-110b.

A waveguide 126 can be used to direct or guide the electromagnetic pulses from the sensor 120 to the material 104. The waveguide 126 includes any suitable structure for directing signals, such as a rod, a rope, a twin rod/rope, or a coaxial probe. Although not shown, the waveguide 126 could be positioned within a stillpipe, which denotes a structure with openings that allow the material 104 to enter into the stillpipe while reducing oscillations of the material level within the stillpipe.

In particular embodiments, the sensor 120 implements Time Domain Reflectometry (TDR) to obtain measurements of the level of material 104 in the tank 102, the location of the interface 112, or other measurements. For example, the sensor 120 can generate and transmit pulses downward into the tank 102 and receive pulses reflected off contents within the tank 102. The pulses can reflect off the top surface 114 of the material 104, any interfaces 112 between different layers 110a-110b of material 104 in the tank 102, the floor 106 of the tank 102, or any obstacles within the tank 102 (such as agitators, ladders, and heat coils). The sensor 120 can analyze the received pulses and, using time-of-flight calculations, estimate an overall height of the material 104 in the tank 102, the location of the interface(s) 112, or thicknesses of different layers of material 104.

Measurements by the sensor 120 can be made with reference to any suitable location, often referred to as a "zero reference point." For example, the zero reference point could denote the floor 106 of the tank 102, the roof 108 of the tank 102, or the top end 122 of the nozzle 118b. Measurements could also be made relative to a known distance, such as a total distance between the roof 108 or top end 122 of the nozzle 118b and the floor 106 of the tank 102. However, measurements of any suitable form could be supported by the sensor 120.

The MCU 124 includes any suitable structure for interacting with or controlling a sensor for a tank. For example, the MCU 124 could include at least one processing device 128, at least one memory 130, and at least one interface 132. Each processing device 128 includes any suitable processing or computing device, such as a microprocessor, microcontroller, digital signal processor (DSP), field programmable gate array (FPGA), application specific integrated circuit (ASIC), or discrete logic devices. Each memory 130 includes any suitable storage and retrieval device, such as a random access memory (RAM), Flash or other read-only memory (ROM), magnetic storage device, solid-state storage device, or optical storage device. Each interface 132 includes any suitable structure facilitating communication over a connection or network, such as a wired interface (like an Ethernet interface), a wireless interface (like a radio frequency transceiver), or an electrical signal network (such as a HART or FOUNDATION FIELDBUS network).

In this example, the sensor 120 includes an electronics assembly 134, a connecting cable 136, and a process connector 138. The electronics assembly 134 generally includes the electrical components used by the sensor 120, such as a transmitter for transmitting electromagnetic pulses, a receiver for receiving reflected electromagnetic pulses, and processing circuitry for generating measurements associated with the material 104 in the tank 102. The connecting cable 136 generally denotes a radio frequency (RF) cable or other connection coupling the electronics assembly 134 with the waveguide 126. The process connector 138 generally denotes a structure that includes a process seal for isolating the internal environment within the tank 102 while allowing connection of the connecting cable 136 to the waveguide 126. Note that while residing within the same physical unit in FIG. 1, the components 134-138 could denote components that reside outside of a common housing or other structure.

Separation of the components 134-138 of the sensor 120 in this manner allows mounting of the electronics assembly 134 at a location that is remote from the process connector 138 or the tank 102 itself. This remote mounting may be necessary or desirable due to a number of factors, such as environmental, mounting, or display limitations.

During operation, electromagnetic pulses generated by the electronics assembly 134 are sent over the connecting cable 136 and through the process connector 138 onto the waveguide 126. The pulses reflect from various surfaces or points, such as the top surface 114, any interfaces 112, the end of the waveguide 126, and obstacles within the tank 102. The electromagnetic pulses also generally reflect from the process connector 138, such as due to an impedance change between the connecting cable 136 and the waveguide 126. This reflection is often mixed with other reflections caused by further impedance transitions downstream from the initial entrance to the process connector 138.

The time required for electromagnetic pulses from the electronics assembly 134 to reach the process connector 138 can vary in different circumstances. For example, the length of the connecting cable 136 can vary in different sensors 120, such as due to production tolerances of the connecting cable 136 or due to a need to mount the electronics assemblies 134 of different sensors 120 at different distances from their respective process connectors 138. Also, the temperature of a connecting cable 136 can vary and alter the length of the connecting cable 136. Without compensation, these and other factors could alter the accuracy of the sensor measurements. For instance, the time-of-flight between transmission of a pulse from the electronics assembly 134 and reception of a reflected pulse at the electronics assembly 134 could differ between different sensors 120 or even within the same sensor 120 when the exact same material level is being measured.

Conventional level gauges often require the use of a connecting cable 136 with a specific known length that is programmed into the level gauge. While somewhat effective, this approach requires manual effort and does not compensate for variations in the connecting cable length, such as those caused by temperature effects and manufacturing tolerances.

In accordance with this disclosure, the sensor 120 executes or implements a matching algorithm to identify certain pulse reflections in received signals (often called an "echo curve"). As part of the matching algorithm, the sensor 120 can identify the reflection of an electromagnetic pulse from the process connector 138. Time-of-flight, TDR, or other calculations could then occur based on the known location of the process connector reflection within the overall echo curve, such as by identifying the time between passage of a pulse through the process connector 138 and reception of a reflected pulse from the material 104 in the tank 102. Using the location of the process connector 138 allows the sensor 120 to effectively identify the end of the connecting cable 136, helping the sensor 120 to compensate for length variations in the connecting cable 136 as well as variations due to temperature effects.

Moreover, it is possible for the reflection from the process connector 138 to overlap with other reflections, which can interfere with the process connector reflection. In order to more effectively identify the process connector reflection, the sensor 120 supports the use of at least one model. Each model mathematically represents at least one reflection of an electromagnetic pulse. For example, a model can be used to estimate what a reflection of an electromagnetic pulse having a specific shape would look like in an echo curve when reflected from a process connector 138.

In some embodiments, the model used to represent a pulse reflection from a process connector 138 denotes an asymmetrical model. In an asymmetrical model, the left lobe of a reflected signal is not the same shape as the right lobe of the reflected signal. This helps to bias the matching algorithm on the first half of an actual process connector reflection caused by an impedance mismatch between the connecting cable 136 and the waveguide 126. The second half of the process connector reflection is more likely to be marred by interference from another subsequent reflection. This can help to reduce or eliminate errors introduced by the mounting configuration of the sensor 120 (including nozzles) and by the reflection from the top surface 114 of the material 104.

Through tailoring of the model (such as for a specific application or a specific electromagnetic pulse shape), the matching algorithm can select a portion of the echo curve that is unmarred by other adjacent reflections as the process connector reflection. This allows the matching algorithm to more accurately identify the true start of the process connector reflection. Since an asymmetrical model having different lobe shapes is used, the model can be tuned to find the section of the process connector reflection that is intact without concern about finding the adjacent lobe in error.

By finding the distance to the process connector 138 dynamically, the sensor 120 does not need to be programmed with the length of the connecting cable 136. However, the estimated length of the connecting cable 136 could still be programmed into and used by the sensor 120. For example, if the approximate length of the connecting cable 136 is known, an appropriately-sized search window can be centered at an approximate distance to eliminate false detections of the process connector reflection further down the echo curve. In other embodiments, since the reflection from the process connector 138 should be the first reflection after a reference peak (described below), the matching algorithm could search for the first match starting from the reference peak, which may eliminate the need to know the approximate length of the connecting cable.

Additional details regarding this sensing functionality are provided below. While the details below may be described with respect to the sensor 120 operating in the system 100 of FIG. 1, the details below could also be used in any other suitable sensors, and those sensors could be used in any other suitable systems.

Although FIG. 1 illustrates one example of an inventory management system 100, various changes may be made to FIG. 1. For example, the functional division shown in FIG. 1 is for illustration only. Various components in FIG. 1 could be combined, further subdivided, rearranged, or omitted or additional components could be added according to particular needs. Also, while various functions may be attributed to specific components in the system 100, other systems could implement those functions in different ways. For instance, the use of a model to locate a process connector reflection in received signals could occur within the MCU 124 rather than the sensor 120. In addition, while the tank 102 is shown here as including two layers 110a-110b of material 104 and a single interface 112, the tank 102 could include any number of layers and any number of material interfaces (including a single layer with no interface).

Figure 2:
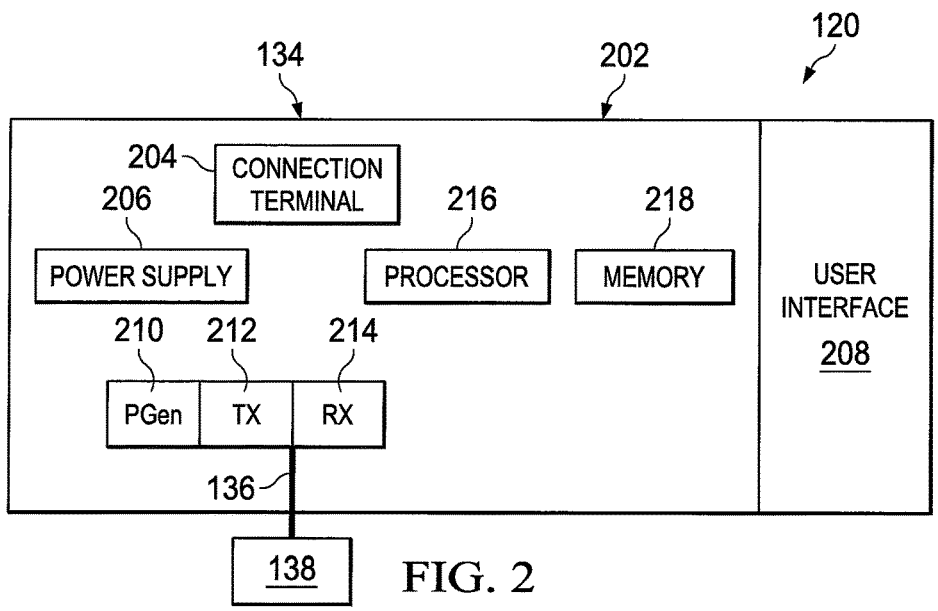
FIG. 2 illustrates an example sensor for inventory management applications according to this disclosure.

FIG. 2 illustrates an example sensor 120 for inventory management applications according to this disclosure. For ease of explanation, the sensor 120 is described as being used in the system 100 of FIG. 1. However, the sensor 120 could be used in any other suitable system.

As shown in FIG. 2, the electronics assembly 134 of the sensor 120 includes a housing 202, which encases, protects, or otherwise includes various components of the sensor 120. The housing 202 could be formed from any suitable material(s) and in any suitable matter. As particular examples, the housing 202 could be formed from metal or ruggedized plastic. The housing 202 could also have any suitable size, shape, and dimensions.

The electronics assembly 134 of the sensor 120 also includes a connection terminal 204 and a power supply 206. The connection terminal 204 allows the sensor 120 to be coupled to an external device, system, or network, such as to the MCU 124. In some embodiments, the connection terminal 204 could allow the sensor 120 to be coupled to a 4-20 mA industrial control current loop, although any other suitable connection could also be supported. In particular embodiments, the connection terminal 204 could be coupled to a HART or FOUNDATION FIELDBUS control loop. However, note that the connection terminal 204 could be replaced or supplemented with a wireless radio that supports wireless communications.

The power supply 206 denotes any suitable source of operating power for the sensor 120, such as at least one battery, capacitor, fuel cell, or solar cell. The power supply 206 could store any suitable amount of power for short or prolonged operation of the sensor 120. In some embodiments, the sensor 120 could be powered over a current loop or other link, and the power supply 206 may only be used to store a small amount of power for the sensor 120. In other embodiments, the sensor 120 could be powered primarily or exclusively by the power supply 206, and the power supply 206 could store a much larger amount of power.

The electronics assembly 134 of the sensor 120 further includes a local user interface 208, which could be used to interact with local users near the sensor 120. For example, the user interface 208 could include a screen or other display for presenting measurements and sensor settings to a user. The user interface 208 could also include buttons (hard or soft) or other input mechanisms for receiving user input, such as input to start or stop sensing or input to change a setting of the sensor 120. The user interface 208 could further support a short-range wireless connection (such as a BLUETOOTH connection) allowing interaction with nearby users via their wireless devices. The user interface 208 denotes any suitable structure(s) facilitating input or output interactions with a user.

In addition, the electronics assembly 134 of the sensor 120 includes various electronic components used to generate, receive, and process electromagnetic signals. For example, the electronics assembly 134 includes a pulse generator 210 and at least one transmitter 212. The pulse generator 210 generates electromagnetic pulses that are transmitted by the transmitter 212 into a tank 102 via the connecting cable 136. Various reflected pulses are received by at least one receiver 214 via the connecting cable 136, and the receiver 214 can pass the reflected pulses (possibly after digitization) to at least one processing device 216 for analysis. The pulses could be transmitted in any suitable manner, such as through the waveguide 126.

The pulse generator 210 includes any suitable structure for generating at least one signal containing pulses. The pulse generator 210 could be adjustable so that pulses of different durations can be generated. The transmitter 212 and the receiver 214 denote any suitable structure(s) for transmitting and receiving signals, respectively. Note that while shown as separate components, the transmitter 212 and the receiver 214 could denote portions of a common transceiver. The transmitter 212 and the receiver 214 could also be coupled to at least one common antenna or to different antennas.

The processing device 216 analyzes information about reflected signals in order to (among other things) identify reflections from the process connector 138 and from the material 104 itself. The reflections can then be used by the processing device 216 to identify the level of the material 104, the location of the interface 112, or other measurements, such as by using time-of-flight or TDR calculations. As noted above and as described in more detail below, the processing device 216 could obtain one or more models (such as those stored in at least one memory 218 or calculated by the processing device 216) and could use the model(s) to identify the process connector reflection more accurately.

Each processing device 216 includes any suitable processing or computing device, such as a microprocessor, microcontroller, DSP, FPGA, ASIC, or discrete logic devices. Each memory 218 includes any suitable storage and retrieval device, such as a RAM, Flash or other ROM, magnetic storage device, solid-state storage device, or optical storage device. Note, however, that the sensor 120 itself need not analyze information in order to determine measurements. As noted above, the MCU 124 could perform these functions, in which case the processing device 216 could pass certain data (such as data defining received signals) to the MCU 124.

Although FIG. 2 illustrates one example of a sensor 120 for inventory management applications, various changes may be made to FIG. 2. For example, the functional division shown in FIG. 2 is for illustration only. Various components in FIG. 2 could be combined, further subdivided, rearranged, or omitted or additional components could be added according to particular needs. Also, while various functions may be attributed to specific components in the sensor 120, other sensors could implement those functions in different ways. For instance, the sensor 120 could pass data defining the received signals to the MCU 124 for analysis.

Figure 4:
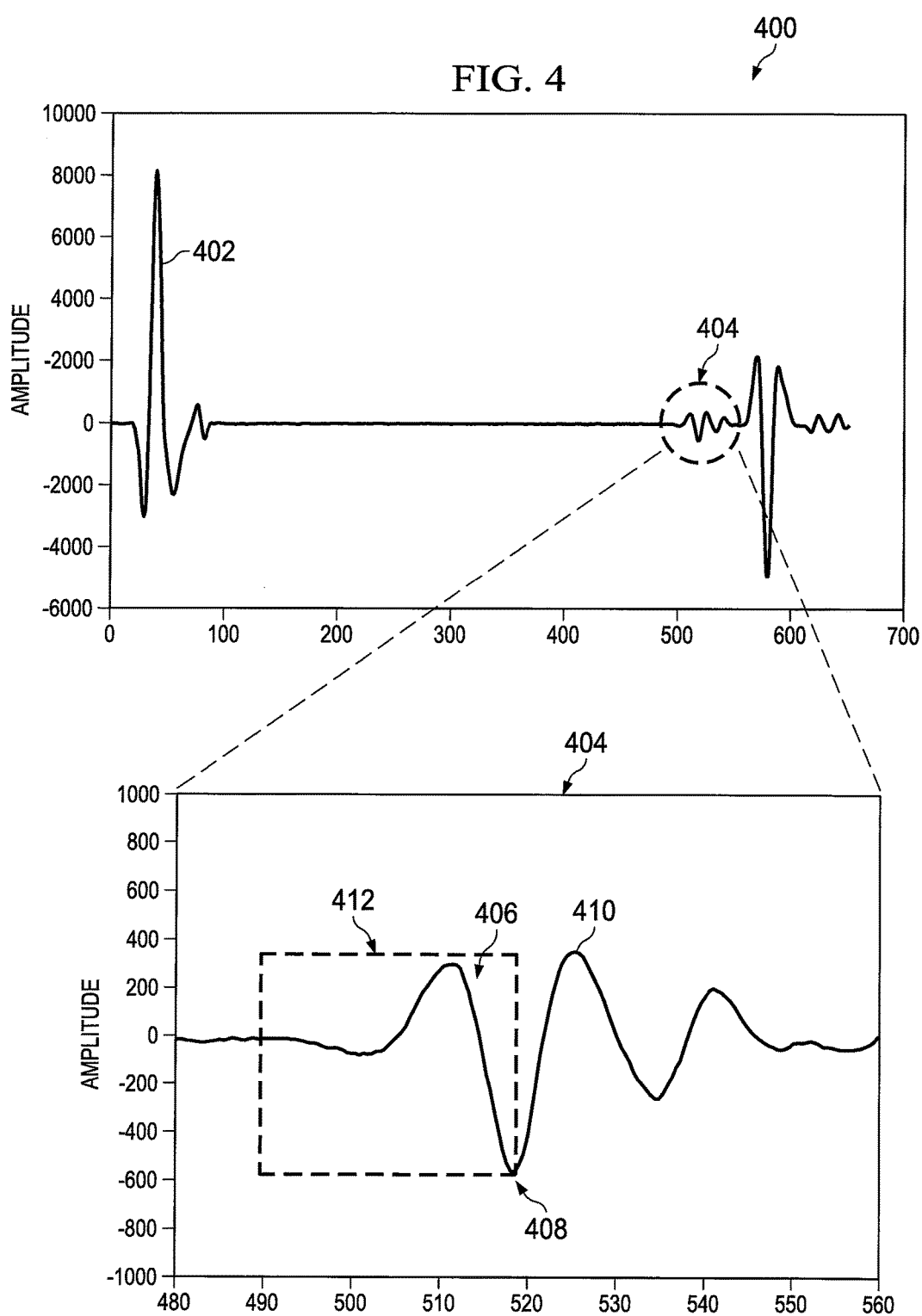

FIGS. 3 and 4 illustrate example uses of a sensor 120 with remote mounting and asymmetric reflection modeling according to this disclosure. For ease of explanation, the signals shown in FIGS. 3 and 4 are described as being processed by the sensor 120 of FIG. 2 in the system 100 of FIG. 1. However, any other suitable sensor could be used in any other suitable system.

As shown in FIG. 3, an echo curve 300 denotes example signals that is could be received by the sensor 120. The echo curve 300 includes a reference pulse 302, which denotes a pulse sent directly to the receiver 214 without passing through the waveguide 126 or being transmitted into the tank 102. For instance, the reference pulse 302 could be sent from the transmitter 212 or pulse generator 210 to the receiver 214 via a circuit path or path through an ASIC or other device in which the components 210-214 are fabricated.

The echo curve 300 also includes an area 304 in which a process connector reflection 306 is located, possibly along with initial reflections from the waveguide 126. The area 304 is shown in an enlarged manner in FIG. 3. The process connector reflection 306 includes a negative peak 308. The impedance change between the connecting cable 136 and the waveguide 126 creates a large reflection 310 that can interfere with the right side of the process connector reflection 306. Without any compensation, this can make it difficult to identify an accurate location of the process connector reflection 306.

Through the use of an asymmetric model, the sensor 120 can accurately identify the portion of the process connector reflection 306 that is unmarred by the nearby large reflection 310. In FIG. 3, a model 312 mathematically estimates what a reflection of an electromagnetic pulse having a specific shape would look like in an echo curve when reflected from a process connector 138. As noted above, in an asymmetrical model, the left lobe of a reflected signal is not the same shape as the right lobe of the reflected signal. This can be seen in FIG. 3, where the model 312 is representing a signal having an asymmetrical shape.

The use of an asymmetrical model helps to bias the matching algorithm on the first half of an actual process connector reflection 306 caused by an impedance mismatch between the connecting cable 136 and the waveguide 126. The second half of the process connector reflection is more likely to be marred by interference from a subsequent reflection. This can help to reduce or eliminate errors introduced by the mounting configuration of the sensor 120 (including nozzles) and by the reflection from the top surface 114 of the material 104.

The model used here can be tailored to a specific use in order to accurately identify the location of the process connector reflection 306. This can be done even in the presence of a strong nearby reflection 310 that interferes with the right portion of the process connector reflection 306. The model can be tailored in any suitable manner, such as by tuning one or more parameters of the model based on known values (such as a pulse shape and a length of the connecting cable 136) or based on training (such as by measuring a material 104 of known height). The model could also be selected from among multiple models, such as when multiple models represent the same pulse shape and different material heights in a tank.

As shown in FIG. 4, an echo curve 400 denotes other example signals that could be received by the sensor 120. The echo curve 400 includes a reference pulse 402 and an area 404 in which a process connector reflection 406 is located. The process connector reflection 406 includes a negative peak 408. Here, the impedance change between the connecting cable 136 and the waveguide 126 creates a smaller nearby reflection 410, which does not cause as much interference with the right side of the process connector reflection 406.

In FIG. 4, a model 412 mathematically estimates what a reflection of an electromagnetic pulse having a specific shape would look like in an echo curve when reflected from a process connector 138. As noted above, in an asymmetrical model, the left lobe of a reflected signal is not the same shape as the right lobe of the reflected signal. This can again be seen in FIG. 4, where the model 412 is representing a signal having an asymmetrical shape.

In either case, the use of an asymmetrical model allows the sensor 120 to accurately identify a process connector reflection in a received echo curve. Because the sensor 120 can more accurately identify the location of the process connector 138 in the echo curve, this allows the sensor 120 to determine more accurate measurements of the material 104 in the tank 102. Moreover, this can occur regardless of the length of the connecting cable 136.

Although FIGS. 3 and 4 illustrate examples of uses of a sensor 120 with remote mounting and asymmetric reflection modeling, various changes may be made to FIGS. 3 and 4. For example, the echo curves and process connector reflections shown here are examples only.

Figure 5:
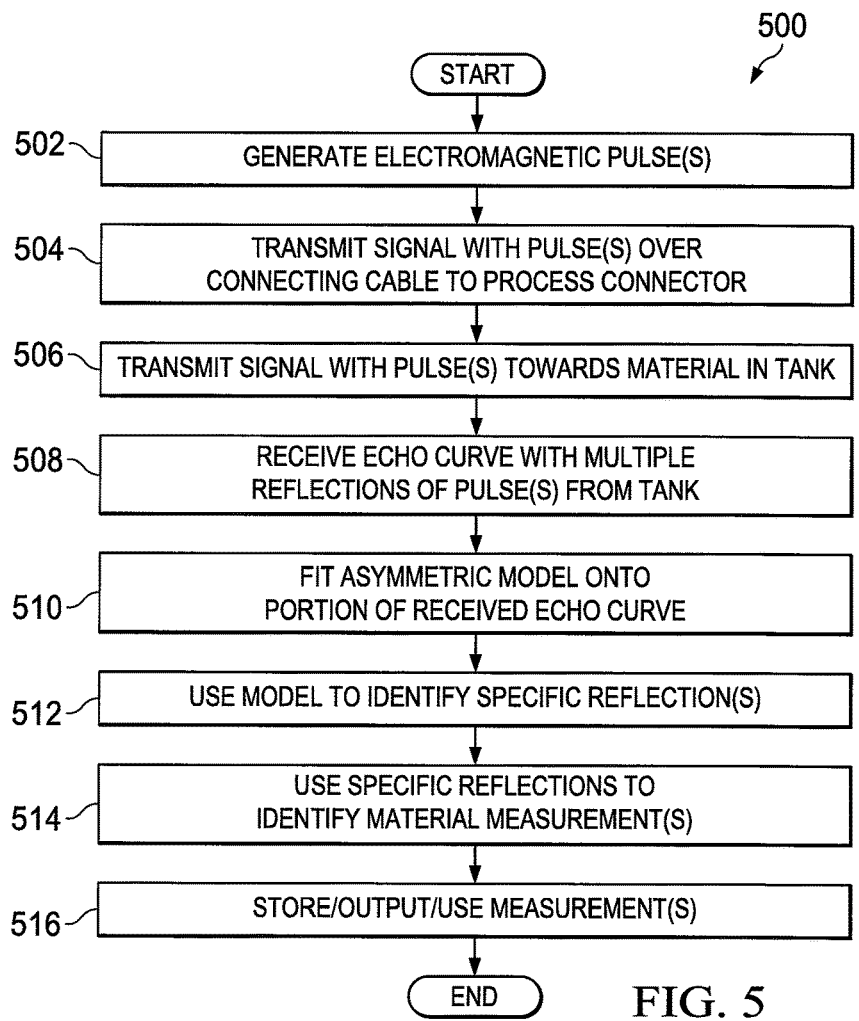
FIG. 5 illustrates an example method for inventory management using a sensor with remote mounting and asymmetric reflection modeling according to this disclosure.

FIG. 5 illustrates an example method 500 for inventory management using a sensor with remote mounting and asymmetric reflection modeling according to this disclosure. For ease of explanation, the method 500 is described as being used by the level sensor 120 of FIG. 2 in the system 100 of FIG. 1. However, the method 500 could be used with any other suitable sensor and any other suitable system.

As shown in FIG. 5, at least one electromagnetic pulse is generated at step 502 and transmitted in a signal over a connecting cable to a process connector at step 504. This could include, for example, the pulse generator 210 of the sensor 120 generating an electromagnetic pulse and the transmitter 212 transmitting a signal containing the pulse. Any number of pulses with any suitable duration(s) and pattern(s) could be generated and transmitted here. The signal with the pulse(s) is transmitted toward material in a tank at step 506. This could include, for example, the signal containing the pulse(s) passing from the connecting cable 136 onto the waveguide 126, which carries the signal into the tank 102 towards the material 104. This can lead to the creation of a process connector reflection.

An echo curve containing multiple reflections of the transmitted pulse(s) is received at step 508. This could include, for example, the receiver 214 of the sensor 120 receiving multiple reflections of the transmitted pulse(s), such as reflections from the process connector 138, the top surface 114, any interfaces 112, the end of the waveguide 126, and obstacles within the tank 102. The echo curve could also include a reference pulse received directly from the pulse generator 210 or the transmitter 212.

An asymmetric model is fit onto a portion of the received echo signal at step 510, and the model is used to identify one or more specific reflections in the received signal at step 512. This could include, for example, the processing device 216 of the level sensor 120 identifying the portion of the echo curve that mostly closely matches an asymmetric model. As noted above, the asymmetric model could be based on various factors, such as the shape of an electromagnetic pulse. The left lobe of a signal reflected from the process connector 138 may not be the same shape as the right lobe of the reflected signal, such as due to interference from a subsequent reflection. Thus, the use of an asymmetric model can help more accurately identify the reflection from the process connector 138. In some embodiments, a search window can be centered at an approximate distance based on the length of the connecting cable 136 to eliminate false detections of the process connector reflection. Once the model is used to identify the process connector reflection, other later reflections (such as from the top surface 114 or an interface 112) can be identified. The asymmetric model here is useful since the reflection from the process connector 138 can become distorted by other reflections, and modeling is used to identify how the process connector reflection can appear in the presence of another reflection. With knowledge of how the process connector reflection can become distorted, the actual location of the process connector reflection can be identified more accurately.

One or more specific reflections are used to identify at least one material measurement at step 514. This could include, for example, the processing device 216 performing time-of-flight, TDR, or other calculations. These calculations can occur based on the location of the process connector reflection, such as by using time-of-flight calculations based on the time for a pulse to travel from the process connector 138 to the top surface 114 or interface 112 and back. Knowledge of the precise location of the process connector reflection allows the level sensor 120 to operate without exact knowledge of the length of the connecting cable 136. The material measurement(s) generated here could include any suitable measurement(s), such as a level of material 104 in the tank 102 (like a location or height of the top surface 114), a position of the interface 112 in the tank 102 (like a location or height of the interface 112), or one or more thicknesses of one or more layers 110a-110b of material 104 in the tank 102.

The one or more material measurements could be stored, output, or used in any suitable manner at step 516. This could include, for example, the processing device 216 outputting the one or more measurements on the user interface 208. This could also include the processing device 216 transmitting the one or more measurements to the MCU 124 or other external destination.

Although FIG. 5 illustrates one example of a method 500 for inventory management using a sensor with remote mounting and asymmetric reflection modeling, various changes may be made to FIG. 5. For example, while shown as a series of steps, various steps in FIG. 5 could overlap, occur in parallel, occur in a different order, or occur any number of times. In particular, the method 500 could be repeated any number of times in quick succession to identify multiple measurements, which could be averaged or otherwise processed to generate one or more final measurements.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a transmitter configured to transmit a signal comprising an electromagnetic pulse towards material in a tank;
a receiver configured to receive a signal comprising multiple reflections of the pulse including a process connector reflection; and
at least one processing device configured to determine a measurement associated with the material in the tank based on the received signal;
wherein, to determine the measurement, the at least one processing device is configured to identify the process connector reflection in the received signal using an asymmetrical model that assists in accurately identifying a portion of the process connector reflection that is unmarred by a nearby large reflection, and wherein the measurement comprises at least one of: a location or a height of an interface between different layers of material in the tank, and at least one thickness of at least one of the different layers of material in the tank.

2. The apparatus of claim 1, wherein:
the transmitter, the receiver, the at least one processing device, and a pulse generator for generating the electromagnetic pulse form at least a part of an electronics assembly; and
a connecting cable couples the electronics assembly and a process connector.

3. The apparatus of claim 2, further comprising: a waveguide coupled to the connecting cable through the process connector, the waveguide configured to transport the signal comprising the electromagnetic pulse toward the material in the tank and to transport the signal comprising the multiple reflections toward the receiver.

4. The apparatus of claim 2, wherein the at least one processing device is further configured to use an estimated length of the connecting cable to identify a window in the received signal where the process connector reflection is located.

5. The apparatus of claim 1, wherein the at least one processing device is further configured to identify a first peak following a reference peak in the received signal and to use the first peak to identify the process connector reflection.

6. The apparatus of claim 1, wherein the at least one processing device is configured to use the asymmetrical model to identify a portion of the process connector reflection unmarred by at least one other reflection that interferes with the process connector reflection in the received signal.

7. The apparatus of claim 1, wherein the asymmetrical model has different lobes of different shapes.

8. A method comprising:
transmitting a signal comprising an electromagnetic pulse towards material in a tank;
receiving a signal comprising multiple reflections of the electromagnetic pulse including a process connector reflection; and
determining a measurement associated with the material in the tank using the received signal, wherein determining the measurement comprises identifying the process connector reflection in the received signal using an asymmetrical model that assists in accurately identifying a portion of the process connector reflection that is unmarred by a nearby large reflection, and wherein the measurement comprises at least one of: a location or a height of an interface between different layers of material in the tank, and at least one thickness of at least one of the different layers of material in the tank.

9. The method of claim 8, wherein:
a transmitter that transmits the signal comprising the electromagnetic pulse, a receiver that receives the signal comprising the multiple reflections, a pulse generator that generates the electromagnetic pulse, and at least one processing device that determines the measurement form at least a part of an electronics assembly; and
a connecting cable couples the electronics assembly and a process connector.

10. The method of claim 9, further comprising: transporting the signal comprising the electromagnetic pulse toward the material in the tank and transporting the signal comprising the multiple reflections toward the receiver using a waveguide coupled to the connecting cable through the process connector.

11. The method of claim 9, further comprising: using an estimated length of the connecting cable to identify a window in the received signal where the process connector reflection is located.

12. The method of claim 8, further comprising:
identifying a first peak following a reference peak in the received signal; and
using the first peak to identify the process connector reflection.

13. The method of claim 8, wherein:
at least one other reflection in the received signal interferes with the process connector reflection; and
the asymmetrical model is used to identify a portion of the process connector reflection unmarred by the at least one other reflection in the received signal.

14. The method of claim 8, further comprising generating, receiving and processing the electromagnetic pulse utilizing an electronics assembly of a sensor, the electronics assembly including a pulse generator and at least one transmitter.

15. A non-transitory computer readable medium containing instructions that, when executed by at least one processing device, cause the at least one processing device to:
obtain information associated with a received signal comprising multiple reflections of an electromagnetic pulse that is transmitted towards material in a tank, the multiple reflections including a process connector reflection; and
determine a measurement associated with the material in the tank using the information associated with the received signal;
wherein the instructions that when executed cause the at least one processing device to determine the measurement comprise: instructions that when executed cause the at least one processing device to identify the process connector reflection in the received signal using an asymmetrical model that assists in accurately identifying a portion of the process connector reflection that is unmarred by a nearby large reflection, and wherein the measurement comprises at least one of: a location or a height of an interface between different layers of material in the tank, and at least one thickness of at least one of the different layers of material in the tank.

16. The non-transitory computer readable medium of claim 15, further containing instructions that, when executed by the at least one processing device, cause the at least one processing device to: use an estimated length of a connecting cable, which couples an electronics assembly and a process connector, to identify a window in the received signal where the process connector reflection is located, the electronics assembly further comprising a pulse generator that generates the electromagnetic pulse.

17. The non-transitory computer readable medium of claim 15, further containing instructions that, when executed by the at least one processing device, cause the at least one processing device to: identify a first peak following a reference peak in the received signal; and use the first peak to identify the process connector reflection.

18. The non-transitory computer readable medium of claim 15, further containing instructions that, when executed by the at least one processing device, cause the at least one processing device to: use the asymmetrical model to identify a portion of the process connector reflection unmarred by at least one other reflection that interferes with the process connector reflection in the received signal.

19. The non-transitory computer readable medium of claim 15, further containing instructions that, when executed by the at least one processing device, cause the at least one processing device to: locate the process connector reflection without using a known or estimated length of a connecting cable that couples an electronics assembly and a process connector.

20. The non-transitory computer readable medium of claim 15, wherein the instructions that when executed cause the at least one processing device to determine the measurement comprise: instructions that, when executed by the at least one processing device, cause the at least one processing device to: use time-of-flight calculations based on a location of the process connector reflection in the received signal to determine the measurement.

* * * * *